United States Patent [19]

Bonnet

[11] 4,368,724

[45] Jan. 18, 1983

[54] AUTOMATIC ANTI-FREEZE SYSTEM FOR SOLAR WATER HEATERS

[76] Inventor: André Bonnet, 17-19, rue A. France, Vincennes, France, 94300

[21] Appl. No.: 158,134

[22] Filed: Jun. 10, 1980

[30] Foreign Application Priority Data

Jun. 29, 1979 [FR] France ............ 79 16850
Mar. 14, 1980 [FR] France ............ 80 05721

[51] Int. Cl.$^3$ ............ F24J 3/02

[52] U.S. Cl. ............ 126/420; 126/418; 137/59

[58] Field of Search ............ 126/420, 422, 419, 417, 126/418, 432; 137/59–62; 138/27, 28, 30, 31

[56] References Cited

U.S. PATENT DOCUMENTS 1,924,251 8/1933 McGuire ............ 137/62
4,044,754 8/1977 Cronin et al. ............ 126/420
4,244,352 1/1981 Foster ............ 126/420

FOREIGN PATENT DOCUMENTS 54-115452 9/1979 Japan ............ 126/420

*Primary Examiner*—James C. Yeung
*Attorney, Agent, or Firm*—Wenderoth, Lind & Ponack

[57] ABSTRACT

A protection device for automatically draining the water contained in a solar energy water heater in case of frost is a frost detector disposed externally of the heater, and includes a heat exchanger formed of a material having a good heat conductivity, preferably metal, secured to a small container filled with water through a bond having a good heat conductivity, and means responsive to a difference between the physical properties of water and ice, notably a variation in the density, and, therefore, a variation in volume and a variation in the electric resistivity. When the outdoor temperature has fallen below the water freezing point in this frost detector, the small volume of water contained in the small container is transformed into ice, and this icing is utilized for producing an electric signal controlling the draining of the heater. Conversely, when the temperature rises from a water icing value to an ice melting value, another signal is produced which differs from the former and causes the heater to be filled automatically with water to be utilized.

6 Claims, 6 Drawing Figures

AUTOMATIC ANTI-FREEZE SYSTEM FOR SOLAR WATER HEATERS

BACKGROUND OF THE INVENTION

The present invention relates in general to solar energy water heaters and has specific reference to automatic means for protecting such heaters against the ill effects of frost.

In regions or countries where outdoor temperatures may fall below the water freezing point, some protection means must be provided to prevent the water from freezing in solar energy collectors and in the pipings leading to and from such systems. Since thermal insulation is not perfect, the expansion of the water due to the freezing thereof may cause serious damage to occur in the complete plant.

When selecting among known means for solving this problem, the following three solutions are generally proposed:

- adding an anti-freeze substance to the water contained in the solar energy heater, by keeping the anti-freeze and water mixture within a closed loop comprising a heat exchanger adapted to transfer the heat received from the sun radiation to the water to be used in the system. As a result, the efficiency of the system is reduced, its cost is increased, and the anti-freeze and water mixture is likely to leak, due to a possible lack of fluid-tightness in the heat exchanger. For this last-mentioned reason, in many countries, the use of anti-freeze and water mixture in sanitary water heating systems is strictly forbidden;
- adding heat to the solar energy elements by creating a circulation of luke warm water therein, or energizing electric Joule-effect heating resistances. This additional heat produced before the internal temperature of the solar energy heater has reached the water freezing point constitutes an energy-consuming solution;
- draining automatically the water contained in the solar energy water heater when the temperature within the solar energy system approaches the water freezing point. The degree of precision of the temperature measuring instrument, located preferably inside the solar energy collector, which delivers the signal for draining water out of the system when the temperature falls below a predetermined threshold, is not reliable, and, like all measuring instruments, displays a magnitude which may depart from the measured magnitude, within limits depending, of course, on its precision.

As a result, this last-mentioned solution is attended by a twofold inconvenience. On the one hand, there is a risk of bursting the water heating elements, as a consequence of water expansion due to the frost effect, in case the predetermined temperature threshold from which the system must be drained is nearer to the water freezing point than the absolute value of the precision of the temperature measuring instrument associated with the system. On the other hand, to avoid this risk of bursting the system as a consequence of water freezing, the care consisting in setting the predetermined temperature threshold from which the system has to be drained at a value relatively remote from the water freezing point is objectionable, in that it increases unduly the corrosion effect in the solar energy heater, due to the alternation of water and air in the fluid circuit.

SUMMARY OF THE INVENTION

The above inconveniences of prior art devices are safely avoided by the automatic anti-freeze device of the present invention, in which, in fact, it is possible to use a single water circulation circuit in which the water contained in the solar energy system is to be utilized, and to reduce the corrosive action caused in the solar energy system by the alternation of water and air in the fluid circulation circuit, by draining the system only when the external temperature has fallen to the water freezing point.

The automatic anti-freeze device according to this invention is disposed externally of the solar energy water heating system and comprises a heat exchanger for transferring heat to and from the atmosphere, which consists of the surface of a body having a good heat conductivity, generally a metal body, secured to a small container filled with water by means of a bond having likewise a good heat conductivity, and a device responsive to one of the differences between the physical properties of water and ice, notably the variation in density, and therefore in volume, and the variation in electrical resistivity.

When the external temperature has fallen to a value below the water freezing point in the frost detector, the water contained in the small container freezes, and this transformation of water into ice is utilized for producing an electric signal causing the automatic draining of the solar energy collector.

When the external or outdoor temperature rises above the ice melting point, the ice contained in the frost detector melts, and this conversion of ice into water generates another electric signal, differing from the first one, which causes the solar energy system to be filled automatically with water to be subsequently used for heating purposes.

The operation of this frost detector is free of any risk, since the water contained therein will reach its solidification temperature more rapidly than the water contained in the solar energy heating system proper, when the external temperature has fallen below the water freezing point.

Thus, for example, it is possible to contemplate a solar energy water heater which, for a one-square meter heat-absorbing surface, contains one liter of water, one cubic decimeter of copper, this absorbing surface being spaced 12 mm from a four-millimeter thick glass plate parallel thereto and exposed to an external wind of 2 m/sec. The temperatures ($\theta a$) in degrees Centigrade (°C.), as a function of time (t) expressed in hours, of the absorbing surface, and therefore of the water contained in the solar energy collector, are as follows:

$$\theta a = \theta c - (\theta c - \theta o)(1.212 \times e^{-1.66t} - 0.212 \times e^{-9.5t})$$

and the temperatures ($\theta v$) in degrees Centigrade (°C.) of the glass plate covering the absorbent surface as a function of the same time (t) are:

$$\theta v = \theta c - (\theta c - \theta o)(0.554 \times e^{-1.66t} + 0.446 \times e^{-9.5t}).$$

Under the same conditions, the temperatures ($\theta d$) in degrees Centigrade (°C.) of the frost detector as a function of the same time (t) are:

$$\theta d = \theta c - (\theta c - \theta o)e^{-22.12t}$$

In these functions, ($\theta o$) is the temperature in degrees Centigrade (°C.) of the solar energy collector and frost detector assembly at the origin of times (t=0), the external temperature in °C. is ($\theta c$), and (e) is the base of the Napierian logarithms.

The digital values are determined, except for experimental errors, as a function of the heat power per unit of the mass of water, and also of the various components involved in the construction of the solar energy collector and of the frost detector, and also of the heat transfer coefficients, on the one hand between the heat absorbing surface of the solar energy collector and the glass plate parallel thereto, and, on the other hand, between the surface of a solid body capable of absorbing and emitting radiation in the near infrared band of the spectrum (having a wavelength of more than five microns) and the atmosphere.

BRIEF DESCRIPTION OF THE DRAWINGS

FIG. 5 is a plan view from above of the frost detector of FIGS. 2-4 and.

DETAILED DESCRIPTION OF THE INVENTION

Figure 1:
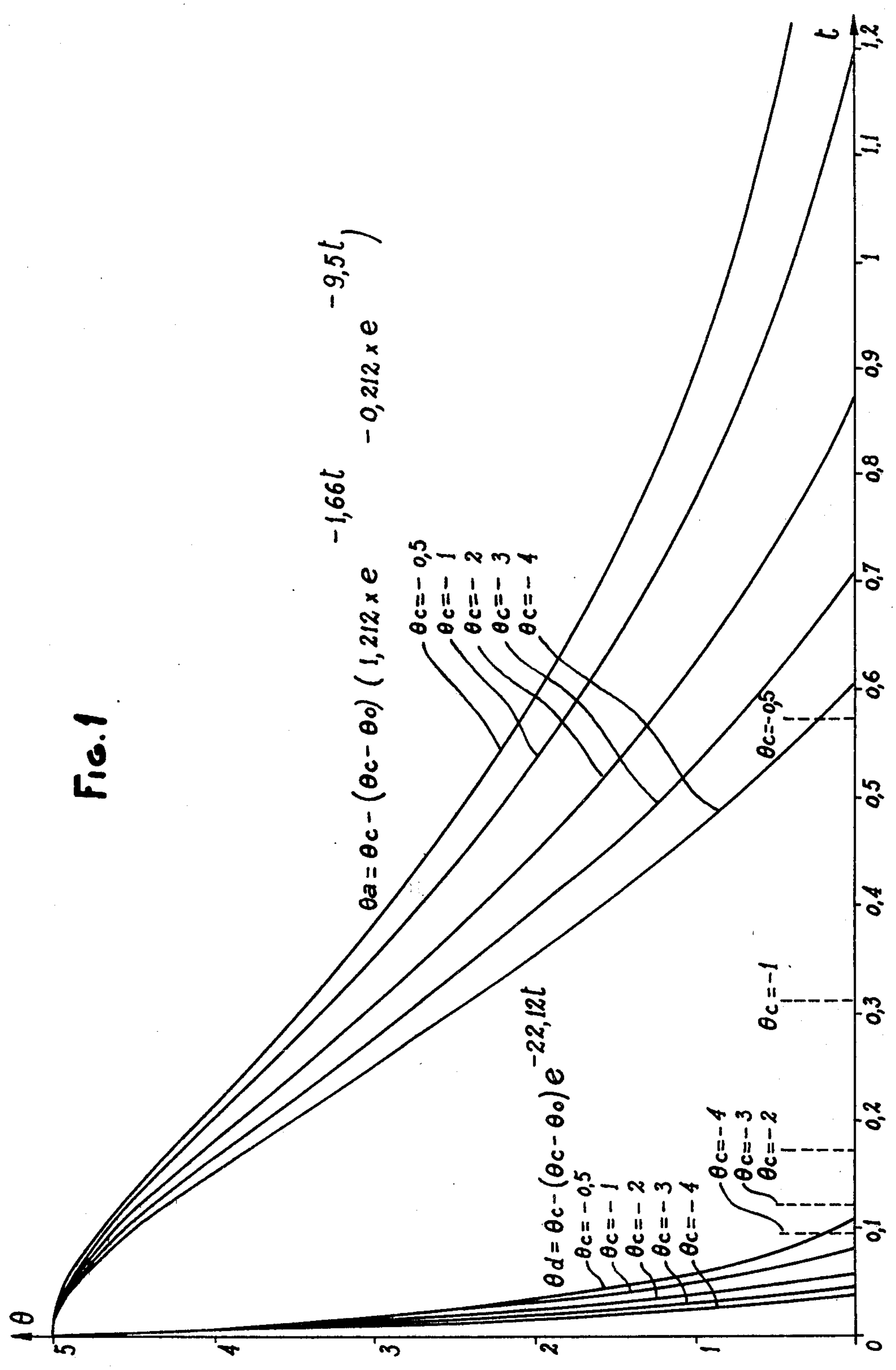
FIG. 1 is a graph plotting temperature curves of a solar energy collector and of a frost detector, with temperature along the ordinate and in abscissa time along the abscissa.

Referring first to FIG. 1 and to the example broadly set forth hereinabove, an upper set of temperature curves ($\theta a$) of the water contained in a solar energy water heater or collector, and a left-hand set of temperature curves ($\theta d$) of a frost detector, are shown as a function of the same time period (t). The temperature scale ($\theta$) is plotted along the ordinate and in degrees Centigrade, and the time scale (t) is plotted along the abscissa and in hours.

The temperature set at zero time (t=0) both for the solar energy collector and for the frost detector is: +5° C. ($\theta o = +5$); the curves shown in FIG. 1 correspond to outdoor temperatures of: −0.5° C. ($\theta c = -0.5$); −1° C. ($\theta c = -1$); −2° C. ($\theta c = -2$); −3° C. ($\theta c = -3$), and −4° C. ($\theta c = -4$), respectively.

Thus, for instance, given an external temperature of −1° C. ($\theta c = -1$), the temperature of the frost detector, and therefore of the water contained therein, will be 0° C. at a moment t=0.081 hour (i.e. 4 mn and 51 sec.), and, from this time on, this water will begin to ice, and one-half of the water contained in the frost detector will be iced after a time t=0.3155 hr (18′ 48″) has elapsed; in the example contemplated herein, the one-half volumetric increment of this water, as a consequence of its transformation into ice, generates an electric signal controlling automatically the draining of the solar energy water heater or collector.

This draining of the water contents of the solar energy collector is possible because, at time t=0.3135 hr (i.e. 18′ 48″), the water temperature in the collector has not reached its freezing point, as shown in FIG. 1 by the corresponding temperature curve at the point of an external temperature of −1° C. ($\theta c = -1$).

The same concept is applicable to the other curves of FIG. 1, and for other values of the initial temperature ($\theta o$) of the solar energy collector and of the frost detector, and also for other values of the external temperature ($\theta c$).

Calculation proves that, during the night, when the external temperatures are slightly lower than the water freezing point, the automatic water draining device of the solar energy collector operates after the water contained therein has reached its freezing point. The most unfavorable point occurs when the outdoor temperature is $\theta c = -\epsilon$, that is, lower than, and infinitely close to the water freezing point, and, in this case, according to the example considered therein, the amount of ice built up is of the order of ten grams per square meter of absorbing surface of the solar energy collector when the operation of the draining device begins.

This unfavorable limit condition, which cannot occur in a natural medium, since it would require an extremely long time period, is attained by a very slight icing of the water contained in the solar energy collector, which (in the example contemplated herein, only one liter per square meter is used, so that a one-percent ice proportion would result), since it would not clog the piping, would not exert any detrimental influence on the draining of the water contents of the solar energy collector.

Moreover, this unfavorable limit condition cannot occur, because the solar energy collector, as a consequence of its slant to the horizontal, is less sensitive to radiation cooling than the frost detector having its heat exchanger (i.e. the element transmitting heat to or from the atmosphere) only slightly inclined to a horizontal plane.

The heat exchange between a surface capable of emitting or receiving infrared radiation and the external atmosphere takes place by convection and radiation. As a result, especially by night and clear, dry weather, radiation cooling becomes preponderant, since the sky being at a lower temperature than air behaves like a black body.

By clear and dry weather, the greenhouse effect caused by clouds tends to disappear, and during the night, at ground level, the temperatures of bodies capable of emitting and absorbing infrared radiation may drop to values lower than the ambient air temperature.

According to this invention, the heat exchange between the atmosphere and the small amount of water contained in the frost detector takes place via a heat exchanger consisting of a substantially horizontal flat sheet of material having a good heat conductivity, preferably metal, having a lagged lower face and an upper face colored to enable this sheet to emit and absorb radiation in the infrared spectrum.

The upper face of the heat exchanger, which, of course, is the sky-facing surface, may have a dark, i.e. black, color capable of emitting and absorbing any radiation. The only purpose of the very slight slant of the heat exchanger with respect to the horizontal is to promote the drainage of water.

The lower or bottom face of the heat exchanger is fastened to a support made of a material having a poor heat conductivity. This support has a central aperture formed therein for enhancing the heat insulation, due to the presence of a volume of air trapped between the bottom of this support and the heat exchanger.

The small container filled with water and the device responsive to one of the differences between the physical properties of water and ice are secured only to the bottom surface of the frost detector heat exchanger and extend into the volume of air.

The heat exchanger may be constructed from sheet metal and formed with a bottom surface polished in the areas exposed to a direct contact with the air, in order to reduce the transmission of infrared radiation.

In order to reflect any infrared radiation, the walls of the central aperture formed in the support, which trap the volume of air, are lined internally with a very thin polished aluminum foil which is not in direct contact with the heat exchanger.

The melting of any snow likely to accumulate on the heat exchanger is accelerated by using a greenhouse heating effect.

For this purpose, a small vertical sheet of a material having a good heat conductivity is secured under one side of the heat exchanger and has its inner face lagged and its outer face exposed to solar radiations.

Snow cannot accumulate on this vertical sheet, of which the surface to be exposed to the sun light is colored black and engages a thin plate of a material transparent to sun rays, but opaque to radiations in the far infrared band (of a wavelength in excess of five microns).

By daylight, the greenhouse effect heating of this small vertical sheet will transmit heat by conductivity to the heat exchanger, in order to accelerate the melting of any snow having accumulated thereon.

According to a first feature characterizing the present invention, the electric signal controlling the automatic draining of the solar energy water heater or collector, when the external temperature has dropped to a value below the water freezing point, is generated as a consequence of the increment in volume of the small amount of water contained in the frost detector during its transformation into ice. As its volume increases, this water causes a membrane of resilient material to undergo an elastic deformation and moves an electric contact carried by a spring blade, thus opening or closing an electric circuit.

According to another feature characterizing the present invention, the electric signal controlling the automatic draining of the solar energy water heater when the external temperature has dropped to a value lower than the water freezing point is generated by an increment in the electric resistivity of the small amount of water contained in the frost detector during its transformation into ice. In fact, the electric resistivity of distilled water is 4 megohms/centimeter, and the electrical resistivity of ice, at a temperature of 0.2 degrees Celsius, is 284 megohms/centimeter. Only a very low electric current flows through this water, so that the heating thereof by the Joule effect is practically negligible. By increasing its electric resistivity during its transformation into ice, the water contained in the frost detector originates an increment in the electrical potential difference between the conductors connecting this detector to an electric current generator.

Exceptionally, and according to this second feature characterizing the present invention, the small container of the frost detector is not filled completely with water; the compression of a small volume of air, hydrogen or other neutral gas enables this small volume of water to increase, as it solidifies, without producing any appreciable pressure increment.

Other features and advantages of the present invention will appear as the following description proceeds, with reference to the attached drawings.

Figure 2:
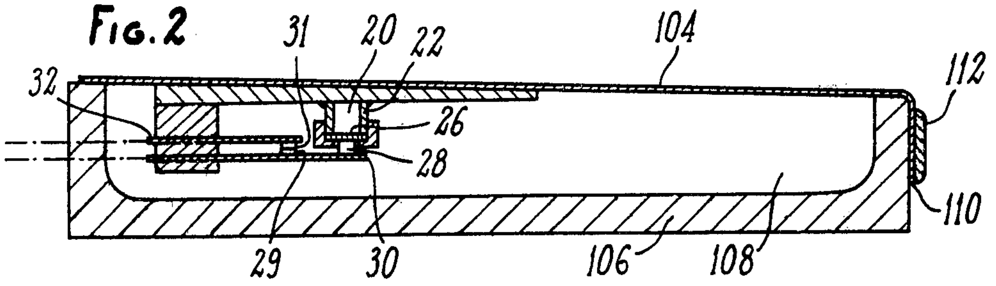
FIGS. 2 and 3 are diagrammatical sectional views showing a first embodiment of the frost detector of this invention under two different temperature conditions.
Figure 3:
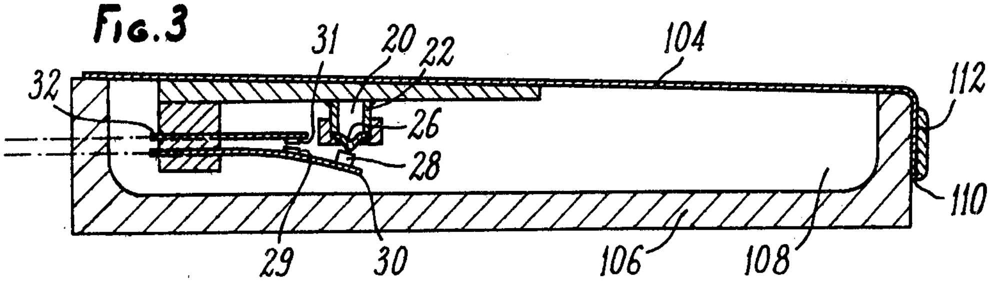
Figure 5:
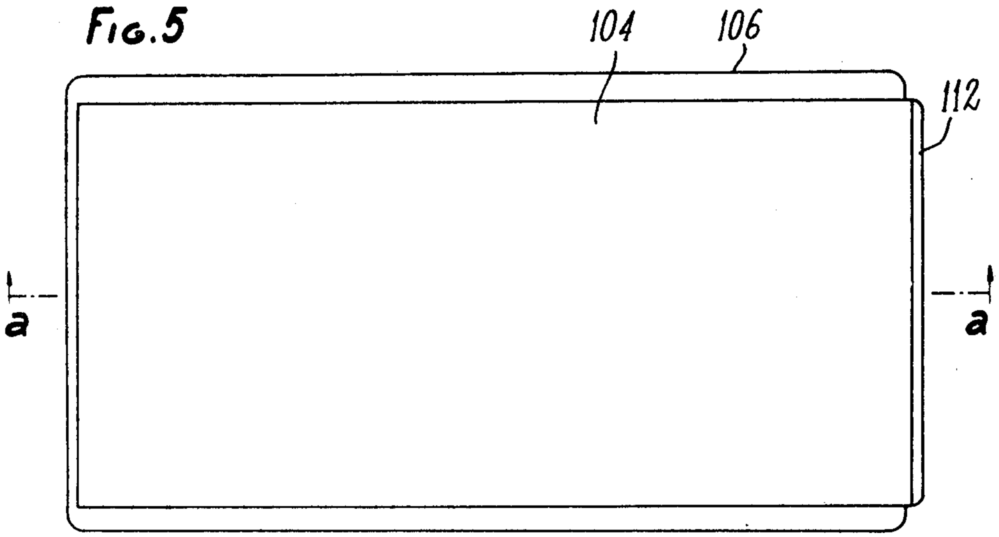

The frost detector according to the first feature of this invention is shown in side elevational view and longitudinal section in FIGS. 2 and 3, and in top view in FIG. 5.

FIG. 2 illustrates the frost detector according to this first embodiment of the invention, when the temperature is above the water freezing point. Since the water 20, in small cup 22, is in its normal or liquid state, the resilient diaphragm 26 closing a bottom of cup 22 is in its released condition, and a contact stud 28 will not bend a spring-steel blade 30 to which it is fixed. As a result, electric contacts 29 and 31, carried by the electrically insulated respective spring blades 30 and 32, engage each other, thus closing the electric circuit between the two steel blades.

FIG. 3 shows the frost detector incorporating the first feature of the present invention, when the temperature is below the water freezing point. Within the small cup 22, the increment in the volume of water 20, which is due to icing thereof, is attended by an elastic deformation of the diaphragm 26 tightly closing the cup 22, whereby the contact stud 28, carried by spring blade 30, is moved downwards and opens the electric circuit between the contact 29, carried by one steel spring blade 30, and the contact 31, carried by the other steel spring blade 32.

Figure 4:
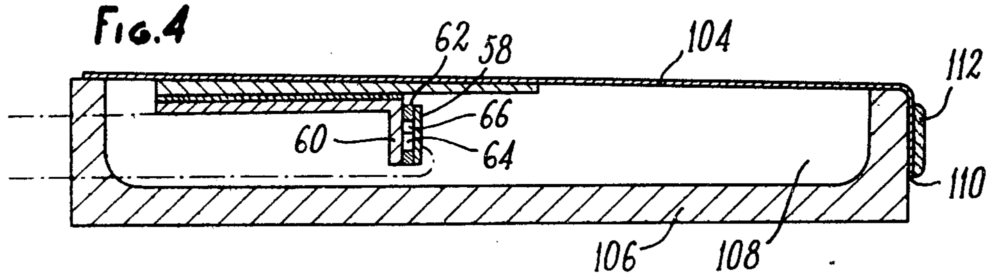
FIG. 4 is a diagrammatical sectional view of a modified embodiment of the frost detector of this invention.

The frost detector according to the second feature characterizing this invention is illustrated in side elevational view and longitudinal section in FIG. 4, and in top view in FIG. 5. This FIG. 5 is unchanged, with respect to the first feature of this invention.

An electric potential difference is created between a small copper plate 58 and another copper plate 60 secured, with the interposition of an electrical insulating sheet, to the heat exchanger. These plates are separated by a distance-piece 62 of electrically non-conductive material. The centre of this distance-piece 62 is apertured, so that a small amount of water 64 and a small volume of gas 66 can be enclosed therein.

In order to reduce water heating by the Joule effect to a negligible value, an electric current of extremely low intensity is caused to flow through this water.

The fact that the electric resistivity of distilled water (4 megohms per centimeter) is lower than the electric resistivity of ice, which, at a temperature of −0.2 degrees Celsius, is 284 megohms per centimeter, originates a different electric potential difference between copper plate 60 and copper plate 58, depending on whether the small amount of water 64 is in the liquid or solid state.

The device for exchanging heat with the external atmosphere, which is the same in the two embodiment of the invention, is illustrated in FIGS. 2 to 5 of the drawing, in the form of a metal sheet 104, secured to a heat insulating support 106.

The enclosed small volume of air 108 surrounds the small volume of the water container of the frost detector, together with the device responsive to differences between the physical properties of water and ice.

The melting of any snow having possibly accumulated on the heat exchanger 104 is accelerated by day, as a consequence of the additional heat from a small vertical sheet 110, consisting of a material having a good heat conductivity and secured under one side of the sheet metal element 104.

This small sheet 110, preferably of metal, has one face cemented to the support 106 of heat insulating material, is black on its other face, and is heated by day as a consequence of the well-known greenhouse effect. This effect is obtained by cementing to the black face of the small metal sheet 110 a thin plate 112 of a material transparent to sunlight, but opaque to radiations in the far infrared band (i.e., having a wavelength greater than five microns).

Another feature characterizing this invention resides in the means implemented for draining or filling with water the solar energy collector or water heater, depending on whether the outdoor temperature has become lower or higher than the water freezing point.

Figure 6:
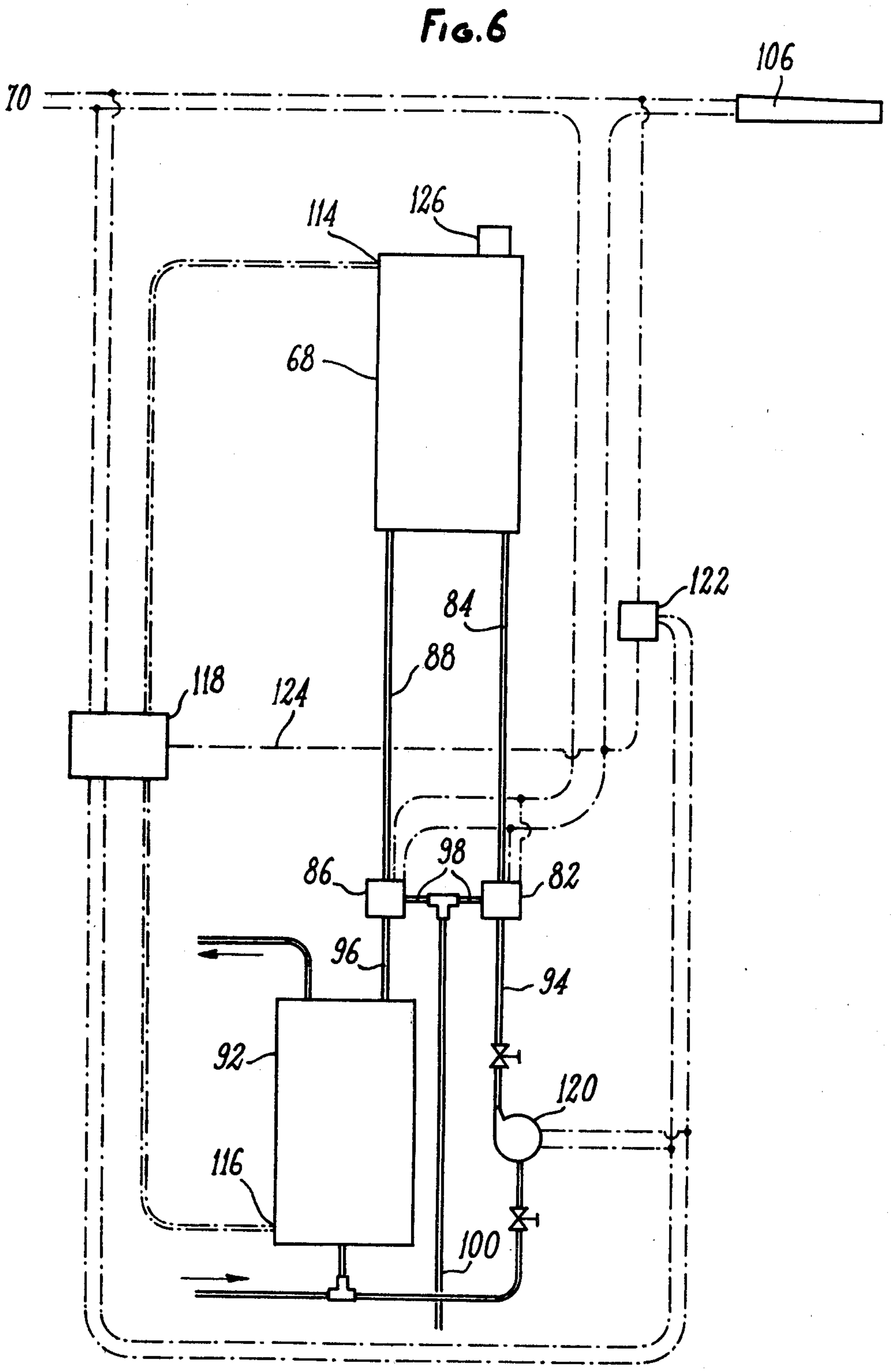
FIG. 6 is a schematic diagram of a system for protecting the solar energy water heater from frost.

The diagram illustrated in FIG. 6 shows the means provided, according to the present invention, for protecting a solar energy water heater 68 against frost, by using a source 70 of electric current and the frost detector according to the first embodiment of the invention, shown in FIGS. 2, 3 and 5, and illustrated in this FIG. 6 in the form of its support 106.

When the outdoor temperature remains above the water freezing point, a three-way solenoid valve 82 is energized and in its operative position, to allow the water to flow into the solar energy water heater via conduit 84, and another three-way solenoid valve 86 is also energized and in its operative position to allow water to drain out from the solar energy water heater via conduit 88.

Under these conditions, the solar energy collector 68 can operate, for example to store hot water in a tank 92, via conduits 94 and 96.

When the outdoor temperature drops to a value below the water freezing point, the electric circuit controlling the frost detector 106 is opened. At this time, both solenoid valves 82 and 86, having their energizing electric circuits connected in series with that of frost detector 106 and with the electric current source 70, are moved to their inoperative positions. The inoperative positions of three-way solenoid valve 82 and three-way solenoid valve 86 are such that the water supply conduit 94 and water draining conduit 96 are cut off, so that any water contained in the solar energy water heater and in the conduits connected thereto is discharged or drained, through conduits 84 and 88, into drain conduits 98 and 100.

Thus, the solar energy water heater remains in its empty condition, even in case the electric current supply source 70 is opened.

Consequently, the thus drained solar energy water heater cannot be damaged in case of frost.

During the period in which the outdoor temperature is below the water freezing point, a sufficient sunning may cause the temperature of the heat-absorbing surface of the solar energy collector to rise above the threshold, causing the energization of electric pump 120.

This electric pump 120 is energized through the medium of the solar energy electric control device 118 when the temperature measured by a heat probe 114, incorporated in the solar energy collector, exceeds a predetermined value, or when the difference between the temperature measured by the temperature probe 114 of the absorbing surface of the solar energy collector and the temperature measured by a temperature probe 116 dipped into the water container, in tank 92, exceeds a predetermined value.

Under these conditions, a front contact relay 122, having its energizing circuit connected in parallel with the electric circuit of pump 120, will close the energizing circuit of solenoid valves 82 and 86. As a result, the solar energy collector 68 will be filled with water which is heated and circulated by the electric pump 120.

By day, when the outdoor temperature is below the water freezing point, the piping system cannot, under these conditions, be choked by ice blocks. In fact, the solar energy collector and the conduits connected thereto are empty, or filled only with water being heated, while kept flowing by the electric pump 120.

When the outdoor temperature remains below the water freezing point, and the temperature of the water contained in the solar energy collector drops to a value causing the deenergization of the electric pump 120, the energizing circuit of electric relay 122 is disconnected from the supply source, thus restoring both solenoid valves 82 and 86 to their inoperative positions and causing any water contained in the solar energy collector 68 to be drained out.

An electric conductor 124 connects the solar energy control unit 118 to another electric conductor connecting valves 82 and 86 to frost detector 106 and relay 122. Thus, an electric signal is fed to the solar energy control unit 118, and this signal differs according to the position of solenoid valves 82 and 86, thus permitting automatically setting different temperature thresholds for energizing the electric pump 120, depending on whether the solar energy collector is empty or filled with water.

An increment in the outdoor temperature above the ice melting point will, of course, cause any ice built up in the frost detector to melt, and thus close the electric circuit associated therewith. Both solenoid valves 82 and 86 become operative, and the solar energy collector 68 is filled with water while any air contained therein is vented off, through a degassing device 126.

According to this invention, the electric circuit of solenoid valves 82 and 86 may be energized by means of a switch and/or a relay having its energizing circuit connected in series with the electric circuit of the frost detector.

It would thus be possible to replace the solenoid valve 86 with a non-return valve, and the temperature probe 114, incorporated in the solar energy collector, with an external solar thermostat.

It would also be possible, still within the scope of the present invention, to use other types of frost detectors and valves, for instance frost detectors capable, when the outdoor temperature falls below the water freezing point, of closing an electric circuit.

Another possibility lies in the use of monitored solenoid valves, or valves becoming inoperative when the solar energy water heater is filled completely with water; or, alternatively, in the use of a d.c. generator capable of supplying automatically electric power to the system in case of emergency, for example in case of failure of the electric supply mains.

Of course, this invention should not be construed as being strictly limited by the specific embodiments shown, disclosed and suggested herein, since many modifications and changes may occur, to those conversant with the art, and be incorporated in the practical use of the invention without departing from the basic principles thereof.

This invention is applicable more particularly to the protection of water-circulation systems against damage caused by frost, to solar energy collectors for supplying hot water for industrial or private use (sanitary water or central-heating water).

What I claim is:

1. A solar energy water heater system comprising:

a solar energy collector adapted to be positioned in an exterior location to be exposed to solar energy;

means for supplying water to said solar energy collector to be heated therein and for discharging heater water from said solar energy collector;

drain means for draining water within said solar energy collector; and means for, when the exterior temperature, initially higher than the freezing point of water, falls below said water freezing point, automatically operating said drain means to drain all said water from said solar energy collector, said automatic operating means being located separately and spaced from said solar energy collector and comprising:

a small-size container containing therein water, said container being closed by a membrane;

heat exchange means, having a surface in direct contact with the exterior atmospheric air, for providing heat exchange between said exterior atmospheric air and said water in said small-size container, whereby when the temperature of said exterior atmospheric air lowers to said water freezing point said water in said small-size container freezes, thereby resulting in a variation in volume of said water in said small-size container and flexing outwardly said membrane; and means, connected to said drain means and responsive to said volume variation, for detecting said volume variation and for generating a drain electrical signal in response thereto to automatically operate said drain means to drain all said water from said solar energy collector, said detecting and generating means comprising an electrical switch movable to a first switching position by said membrane flexing outwardly, said membrane deflecting inwardly in response to melting of said frozen water in said container upon said exterior temperature reaching the melting point of ice, and said electrical switch being movable to a second switching position by such inward deflection of said membrane for generating a fill electrical signal to automatically operate said drain means to allow refilling of water into said solar energy collector.

2. A system as claimed in claim 1, wherein said heat exchange means comprises a plate of material having high heat conductivity, said plate being positioned to be slightly inclined to the horizontal, said plate having an upper surface oriented toward the sky and of a color capable of emitting and absorbing infrared radiation, and said plate having a lower surface in contact with a support formed of insulating material.

3. A system as claimed in claim 2, wherein said plate material comprises metal.

4. A system claimed in claim 2, wherein said support has therein a recess, and said detecting and generating means is connected to said plate within said recess but without direct contact with said support.

5. A system as claimed in claim 1, wherein said water supplying means includes a pump, and further comprising control means for, when said detecting means detects that said exterior temperature is below said water freezing point, but sufficient solar energy exists for said solar energy collector to heat water therein, preventing draining by said draining means only when said pump is operable to continuously circulate water through said solar energy collector.

6. A system as claimed in claim 5, wherein said pump is operable to circulate water through said solar energy collector in response to different amounts of solar energy absorbed by said solar energy collector, depending on whether said solar energy collector is filled with water or drained.

* * * * *